United States Patent
Sato et al.

(10) Patent No.: US 9,843,055 B2
(45) Date of Patent: Dec. 12, 2017

(54) SEPARATOR FOR USE IN FUEL CELL, AND FUEL CELL (71) Applicant: TOYOTA JIDOSHA KABUSHIKI KAISHA, Toyota-shi, Aichi-ken (JP)

(72) Inventors: Kenji Sato, Kasugai (JP); Takuya Kurihara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 38 days.

(21) Appl. No.: 14/900,639

(22) PCT Filed: Oct. 23, 2014

(86) PCT No.: PCT/JP2014/005393
§ 371 (c)(1),
(2) Date: Dec. 22, 2015

(87) PCT Pub. No.: WO2015/068349
PCT Pub. Date: May 14, 2015

(65) Prior Publication Data
US 2016/0248105 A1  Aug. 25, 2016

(30) Foreign Application Priority Data

Nov. 11, 2013 (JP) ................. 2013-233110

(51) Int. Cl.
*H01M 8/02* (2016.01)
*H01M 8/0267* (2016.01)
(Continued)

(52) U.S. Cl.
CPC ....... *H01M 8/0267* (2013.01); *H01M 8/0273* (2013.01); *H01M 8/0276* (2013.01); *H01M 8/1004* (2013.01); *H01M 8/2483* (2016.02)

(58) Field of Classification Search
CPC .................................................. H01M 8/0267
See application file for complete search history.

(56) References Cited

U.S. PATENT DOCUMENTS 9,698,433 B2 * 7/2017 Goto ................... H01M 8/0276
2002/0122970 A1 * 9/2002 Inoue ................ B29C 45/14344
264/154
(Continued)

FOREIGN PATENT DOCUMENTS

JP  2006-310288  11/2006
JP  2007-250351  9/2007
(Continued)

*Primary Examiner* — Matthew Merkling
(74) *Attorney, Agent, or Firm* — Finnegan, Henderson, Farabow, Garrett & Dunner, LLP (57) ABSTRACT

A separator that is used for a fuel cell includes: a separator center area that is arranged to face a power generation area of the membrane electrode assembly; an outer peripheral portion that is extended from the separator center area to outer periphery; a first manifold hole and a second manifold hole that are provided in the outer peripheral portion; a fluid flow path that is arranged to extend from the first manifold hole through the separator center area to the second manifold hole; and a gasket that is provided on the outer peripheral portion to surround an area of the fluid flow path and outer circumferences of the first and second manifold holes. The gasket is divided into first gasket portions that are provided adjacent to ends of the separator center area and are extended along respective side edges at the ends, and second gasket portions that are provided to surround the outer circumferences of the first manifold hole and the second manifold hole, respectively. The first gasket portions have a larger width than a width of the second gasket portions.

8 Claims, 4 Drawing Sheets

(51) Int. Cl.
*H01M 8/1004* (2016.01)
*H01M 8/0273* (2016.01)
*H01M 8/0276* (2016.01)
*H01M 8/2483* (2016.01)

(56) References Cited

U.S. PATENT DOCUMENTS

| | | | |
|---|---|---|---|
| 2002/0127461 A1* | 9/2002 | Sugita | H01M 8/0271 429/465 |
| 2003/0104262 A1* | 6/2003 | Kuroki | H01M 8/0213 429/510 |
| 2005/0089745 A1* | 4/2005 | Sugita | H01M 8/241 429/469 |
| 2005/0249997 A1* | 11/2005 | Tomimatsu | H01M 8/0213 429/457 |
| 2009/0098434 A1 | 4/2009 | Sano et al. | |
| 2009/0136811 A1 | 5/2009 | Kusakabe et al. | |
| 2009/0197148 A1 | 8/2009 | Sato et al. | |
| 2012/0107718 A1* | 5/2012 | Masaka | H01M 8/0202 429/482 |

FOREIGN PATENT DOCUMENTS

| | | |
|---|---|---|
| JP | 2009-187790 | 8/2009 |
| JP | 2011-222393 | 11/2011 |

* cited by examiner

SEPARATOR FOR USE IN FUEL CELL, AND FUEL CELL

CROSS-REFERENCE TO RELATED APPLICATIONS

This application is a national phase application of International Application No. PCT/JP2014/005393, filed Oct. 23, 2014, and claims the priority of Japanese Application No. 2013-233110, filed Nov. 11, 2013, the content of both of which is incorporated herein by reference.

TECHNICAL FIELD

The present invention relates to a separator for use in a fuel cell, and a fuel cell.

BACKGROUND ART

In general, a fuel cell has stacked structure in which a plurality of unit cells are stacked. Each unit cell is configured such that a membrane electrode assembly is located to face separators. The separator has a reactive gas flow path provided for the flow of a reactive gas in the unit cell and a cooling medium flow path provided for the flow of a cooling medium in the unit cell. The separator also has a reactive gas manifold hole provided to distribute the reactive gas to the reactive gas flow path and a cooling medium manifold hole provided to distribute the cooling medium to the cooling medium flow path. These manifold holes have openings on the surface of the separator and are formed in a penetrating configuration in a stacking direction of the fuel cell stack to form respective manifolds. Gaskets are provided appropriately around the reactive gas flow path, the cooling medium flow path, the reactive gas manifold hole and the cooling medium manifold hole to suppress leakage of the respective fluids. For example, Patent Literatures 1 and 2 describe configurations in which a gasket is provided in an outer circumferential portion of a membrane electrode assembly which is to be placed between separators.

CITATION LIST

Patent Literature

PTL 1: JP 2007-250351A
PTL 2: JP 2008-310288A

SUMMARY

Technical Problem

In a configuration where a gasket is provided on the separator, there is a problem that adhesive durability of the gasket is likely to be reduced at a location where the temperature is likely to be increased by transfer of heat generated in a power generation area of the membrane electrode assembly. For example, the gasket may be provided in a cooling medium flow path surface of the separator to surround the entire outer circumference of the cooling medium flow path and the cooling medium manifold hole, in order to suppress leakage of the cooling medium from the cooling medium flow path and the cooling medium manifold hole formed on the cooling medium flow path surface. This gasket is likely to be peeled off at a location exposed to high-temperature water as the cooling medium, and its adhesive durability is significantly reduced. A gasket provided to suppress leakage of the reactive gas from the reactive gas flow path and the reactive gas manifold hole has a similar problem. Accordingly, there is a need to improve the adhesive durability of the gasket provided on the separator.

Solution to Problem

In order to solve at least part of the above problems, the invention may be implemented by any of the following aspects.

(1) An aspect of the present invention is a separator that is used for a fuel cell and is to be located to face a membrane electrode assembly. The separator includes: a separator center area that is arranged to face a power generation area of the membrane electrode assembly; an outer peripheral portion that is extended from the separator center area to outer periphery; a first manifold hole and a second manifold hole that are provided in the outer peripheral portion; a fluid flow path that is arranged to extend from the first manifold hole through the separator center area to the second manifold hole; and a gasket that is provided on the outer peripheral portion to surround an area of the fluid flow path and outer circumferences of the first and second manifold holes. The gasket is divided into first gasket portions that are provided adjacent to ends of the separator center area and are extended along respective sides or side edges at the ends, and second gasket portions that are provided to surround the outer circumferences of the first manifold hole and the second manifold hole, respectively. The first gasket portions have a larger width than a width of the second gasket portions.

The first gasket portions are provided at the location that is more likely to reduce the adhesiveness by the temperature due to heat generation of the membrane electrode assembly as described in the above problem. In the separator of this aspect, since the width of the first gasket portions is set to be larger than the width of the second gasket portions, that improves the adhesive durability of the gasket.

(2) In the separator of the above aspect, the first gasket portions each may include a first profile portion that is extended to have a same width with the width of the second gasket portions, and a side flow suppressing portion that is provided to suppress part of a fluid flowing in the fluid flow path from flowing through a side flow area outside of the end of the separator center area, wherein the first profile portion and the side flow suppressing portion are integrally molded.

In the separator of this aspect, since the first profile portion that is extended to have the same width as the width of the second gasket portion is integrally molded with the side flow suppressing portion, this causes the width of the first gasket portion to be larger than the width of the second gasket portion. This configuration improves the adhesive durability of the gasket without providing a side flow suppressing member as a separate member.

(3) In the separator of the above aspect, the first gasket portions each may include a first profile portion that is extended to have a same width with the width of the second gasket portions, and an additional portion that is provided substantially parallel to the first profile portion, wherein the first profile portion and the additional portion are integrally molded.

In the separator of this aspect, since the first profile portion that is extended to have the same width as the width of the second gasket portion is integrally molded with the additional portion that is provided substantially parallel to the first profile portion, this causes the width of the first gasket portion to be larger than the width of the second gasket portion.

(4) In the separator of the above aspect, the fluid may be a cooling medium, the fluid flow path may a cooling medium flow path for the cooling medium, the first manifold hole may be a manifold hole for supplying the cooling medium, and the second manifold hole may be a manifold hole for discharging the cooling medium.

As described in the above problem, the temperature of the cooling medium is likely to be increased by heat generation of the membrane electrode assembly, and the first gasket portions that are provided adjacent to the ends of the separator center area to be extended along the sides of the membrane electrode assembly at the ends are likely to reduce their adhesive durability by exposure to the high-temperature cooling medium. In the separator of the fuel cell according to this aspect, since the width of the first gasket portions is set to be larger than the width of the second gasket portions, this improves the adhesive durability of the gasket.

The invention may be implemented by various aspects other than the aspects of the separator described above, for example, a unit cell of a fuel cell including the separator of the above aspect, a fuel cell including the unit cells and a fuel cell system including the fuel cell.

DESCRIPTION OF EMBODIMENTS

A. First Embodiment

Figure 1:
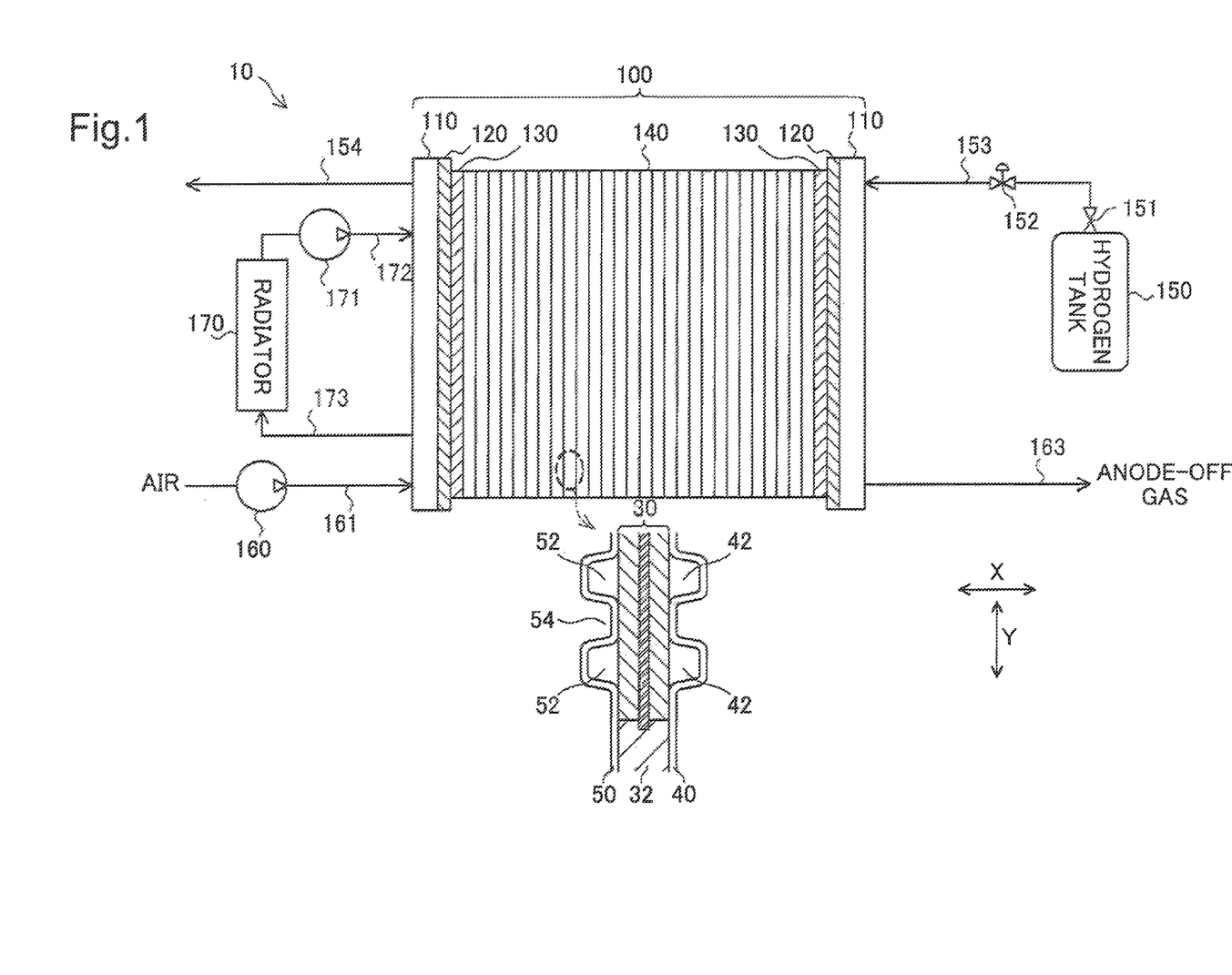
FIG. 1 is a diagram illustrating the schematic configuration of a fuel cell system according to a first embodiment of the invention.

FIG. 1 is a diagram illustrating the schematic configuration of a fuel cell system 10 according to a first embodiment of the invention. The fuel cell system 10 includes a fuel cell stack 100. The fuel cell stack 100 has stacked structure in which an end plate 110, an insulating plate 120, a collector plate 130, a plurality of unit cells 140, another collector plate 130, another insulating plate 120 and another end plate 110 are stacked in this sequence. The stacking direction of the unit cells 140 is a direction X (horizontal direction) perpendicular to a vertical direction Y.

Hydrogen is supplied as a fuel gas from a hydrogen tank 150, configured to store high-pressure hydrogen, to the fuel cell stack 100 via a shutoff valve 151, a regulator 152 and a supply pipe 153. The fuel gas (anode-off gas) that is not consumed in the fuel cell stack 100 is discharged through a discharge pipe 163 out of the fuel cell stack 100. The fuel cell system 10 may have a recirculation mechanism configured to recirculate the anode-off gas to the supply pipe 153. The air is supplied as an oxidizing gas to the fuel cell stack 100 via an air pump 160 and a supply pipe 161. The oxidizing gas (cathode-off gas) that is not consumed in the fuel cell stack 100 is discharged through a discharge pipe 154 out of the fuel cell stack 100. The fuel gas and the oxidizing gas are also called reactive gases.

Cooling medium cooled by a radiator 170 is also supplied to the fuel cell stack 100 via a water pump 171 and a pipe 172, in order to cool the fuel cell stack 100. The cooling medium discharged from the fuel cell stack 100 is recirculated through a pipe 173 to the radiator 170. As the cooling medium there may be used, for example, water, antifreeze liquid such as ethylene glycol, or the air. This embodiment employs water (also called "cooling water") as the cooling medium.

The unit cell 140 is configured such that a membrane electrode assembly (MEA) 30 including an anode and a cathode placed on respective surfaces of an electrolyte membrane is placed between a pair of separators, or more specifically an anode-side separator 50 and a cathode-side separator 40. As shown in an enlarged view at the bottom of FIG. 1, the anode-side separator 50 has a plurality of fuel gas flow channels 52 in streak shape provided on its MEA 30-side surface and a plurality of cooling medium flow channels 54 in linear shape provided on an opposite surface to the MEA 30-side. The cathode-side separator 40 has a plurality of oxidizing gas flow channels 42 in linear shape provided on its MEA 30-side surface. A resin seal member 32 having insulating properties is provided along the outer circumference of the MEA 30 placed between the anode-side separator 50 and the cathode-side separator 40.

Figure 2:
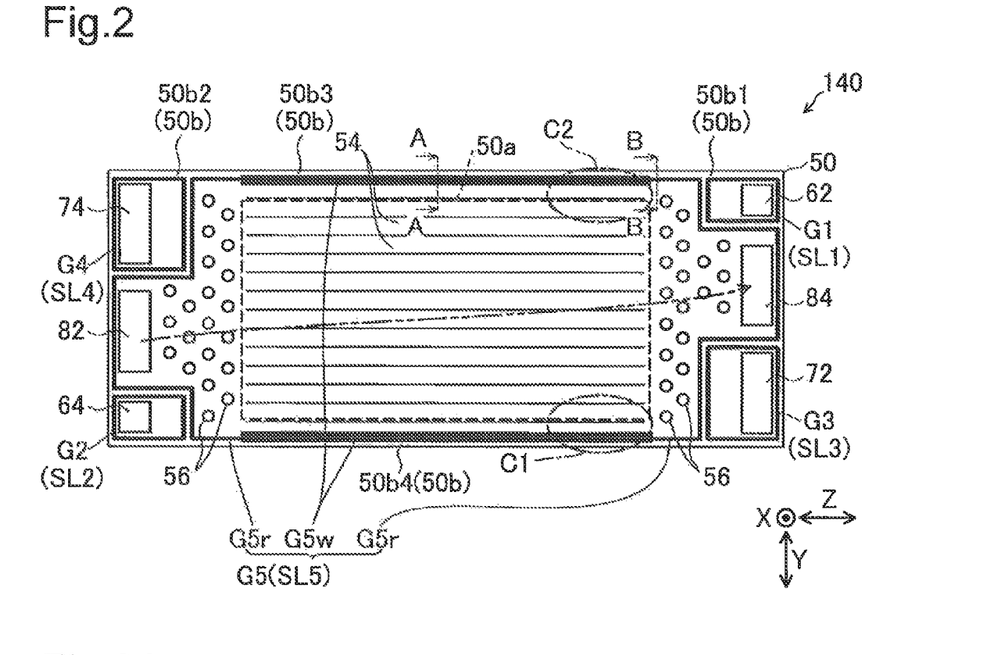
FIG. 2 is a schematic plan view illustrating an anode-side separator of a unit cell viewed from an opposite side to an MEA side.

FIG. 2 is a schematic plan view illustrating the anode-side separator 50 of the unit cell 140 viewed from an opposite side to the MEA 30-side. In FIG. 2, a front-rear direction corresponds to the stacking direction X, and a top-bottom direction corresponds to the vertical direction Y. The anode-side separator 50 and the cathode-side separator 40 are made of a material having gas barrier properties and electron conductivity, for example, a carbon material such as dense carbon produced by compressing carbon particles to be gas impermeable or a metal material such as stainless steel or titanium. According to this embodiment, separator plates manufactured by press-molding titanium are used as the separators 40 and 50.

The anode-side separator 50 has a separator center area 50a in a rectangular shape (area surrounded by the broken line in FIG. 2) arranged to face a power generation area of the MEA 30, and a frame-like outer peripheral portion 50b extended from the outer circumference of the separator center area 50a to the four edges of the separator 50. The "power generation area" denotes an area involved in power generation in the MEA 30, and is an area in which the fuel gas flows in the MEA 30, or more specifically a substantially rectangular area where the plurality of fuel gas flow channels 52 (shown in FIG. 1) are present in the plan view in the stacking direction X. The separator center area 50a is overlapped with the power generation area in the plan view in the stacking direction X. A left-right direction Z shown in FIG. 2 is a direction perpendicular to both the vertical direction Y and the stacking direction X. The outer peripheral portion Sob is a substantially rectangular frame-like area including a first outer edge portion 50b1 located on one side in the left-right direction Z (right-hand side in the illustration) relative to the separator center area 50a, a second outer edge portion 50b2 located on the other side in the left-right direction Z (left-hand side in the illustration) relative to the separator center area 50a, a third outer edge portion 50b3 located on the upper side in the vertical direction Y relative to the separator center area 50a, and a fourth outer edge portion 50b4 located on the lower side in the vertical direction Y relative to the separator center area 50a.

In an outer end portion of the first outer edge portion 50b1 on the right-hand side of the outer peripheral portion 50b, there are provided a fuel gas supply manifold hole 62, a cooling medium discharge manifold hole 84 and an oxidizing gas supply manifold hole 72, located sequentially from the top in the vertical direction Y. On the other hand, in an outer end portion of the second outer edge portion 50b2 on the left-hand side, there are provided an oxidizing gas discharge manifold hole 74, a cooling medium supply manifold hole 82 and a fuel gas discharge manifold hole 64, located sequentially from the top in the vertical direction Y. The fuel gas supply manifold hole 62 and the fuel gas discharge manifold hole 64, the oxidizing gas supply manifold hole 72 and the oxidizing gas discharge manifold hole 74, and the cooling medium supply manifold hole 82 and the cooling medium discharge manifold hole 84 are respectively arranged to be opposed to each other in the outer edge portions on the respective sides in the left-right direction Z.

The fuel gas supply manifold holes 62 form a fuel gas supply manifold that is configured to distribute the fuel gas supplied to the fuel cell stack 100 to the fuel gas flow channels 52 (shown in FIG. 1) of the respective unit cells 140. The fuel gas discharge manifold holes 64 form a fuel gas discharge Manifold that is configured to collect the fuel gas that is not consumed in the fuel as flow channels 52 and discharge the collected fuel gas out of the fuel cell stack 100. The oxidizing gas supply manifold holes 72 form an oxidizing gas supply manifold that is configured to distribute the oxidizing gas supplied to the fuel cell stack 100 to the oxidizing gas flow channels 42 (shown in FIG. 1) of the respective unit cells 140. The oxidizing gas discharge manifold holes 74 form an oxidizing gas discharge manifold that is configured to collect the oxidizing gas that is not consumed in the oxidizing gas flow channels 42 and discharge the collected oxidizing gas out of the fuel cell stack 100. The cooling medium supply manifold holes 82 form a cooling medium supply manifold that is configured to distribute the cooling medium supplied to the fuel cell stack 100 to the respective unit cells 140. The cooling medium discharge manifold holes 84 form a cooling medium discharge manifold that is configured to collect the cooling medium discharged from the respective unit cells 140 and discharge the collected cooling medium out of the fuel cell stack 100. The respective manifold holes 62, 64, 72, 74, 82 and 84 have openings in a substantially rectangular shape. The respective manifolds have a shape extending in the stacking direction X of the fuel cell stack 100. No holes or openings passing through the separator 50 are provided in remaining areas of the separator 50 other than these manifold holes 62, 64, 72, 74, 82 and 84.

Gaskets G1 to G5 are provided on the surface of the anode-side separator 50. These gaskets G1 to G5 are provided to form seal lines SL1 to SL5 that surround the power generation area and the outer circumferences of the openings of the respective manifold holes in the plan view in the stacking direction in the state that the plurality of unit cells 140 are stacked. The gaskets are formed by, for example, injection molding or press molding and have cross sections of protruded shape. In the state that the plurality of unit cells 140 are stacked, the seal lines SL1 to SL5 are formed to be in close contact with the surface of another adjacent unit cell 140. More specifically, the gaskets are provided to abut against and to be in close contact with the surface of the cathode side separator 40 of another adjacent unit cells 140. The seal lines SL1 and SL2 of the gaskets G1 and G2 serve to suppress leakage of the fuel gas. The seal lines SL3 and SL4 of the gaskets G3 and G4 serve to suppress leakage of the oxidizing gas. The seal line SL5 of the gasket G5 serves to suppress leakage of the cooling medium.

As the material of the gasket there may be used a rubber or a thermoplastic elastomer. The usable rubber may be any of various rubbers such as silicon rubber, butyl rubber, acrylic rubber, natural rubber, fluororubber, and ethylene-propylene rubber. The usable thermoplastic elastomer may be any of various thermoplastic elastomers such as styrene elastomer and fluorine elastomer. This embodiment uses ethylene-propylene-1-butene, copolymer (EPBM). The gasket is bonded and fixed to the separator by an adhesive agent. The adhesive agent is not specifically limited, but any of various adhesive agents may be usable according to the material of the gasket. This embodiment uses, for example, a silane coupling agent.

FIG. 2 illustrates a plane of the anode-side separator 50 on which the cooling medium flows in the planar direction (hereinafter called "cooling medium flow path surface"). The plurality of cooling medium flow channels 54 in straight shape (also shown in FIG. 1) are formed in the separator center area 50a. The cooling medium supplied from the cooling medium supply manifold hole 82 is diffused through an area provided with dimples 56, is distributed to the respective cooling medium flow channels 54 in the separator center area 50a, flows through the respective cooling medium flow channels 54, is collected from the respective cooling medium flow channels 54 to the area provided with the dimples 56, and is discharged from the cooling medium discharge manifold hole 84. Accordingly, the gasket G5 for the cooling medium is provided to include the separator center area 50a arranged to face the power generation area, as well as the cooling medium manifold holes 82 and 84. More specifically, the gasket G5 for the cooling medium is provided to go outside of the cooling medium supply manifold hole 82 in the second outer edge portion 50b2 on the left-hand side, outside of the third outer edge portion 50b3 on the upper side and outside of the fourth outer edge portion 50b4 on the lower side, which are respectively adjacent to the ends of the separator center area 50a, and outside of the cooling medium discharge manifold hole 84 in the first outer edge portion 50b1 on the right-hand side, so as to generally surround the outer circumference of the cooling medium flow path area.

The gasket G5 for the cooling medium is divided into two first gasket portions G5w and two second gasket portions G5r. The first, gasket portions G5w denote portions arranged to go outside of the third outer edge portion 50b3 on the upper side and outside of the fourth outer edge portion 50b4 on the lower side, which are respectively adjacent to the ends of the separator center area 50a. The second gasket portions G5r denote portions arranged to go outside of the cooling medium supply manifold hole 82 in the second outer edge portion 50b2 on the left-hand side and outside of the cooling medium discharge manifold hole 84 in the first outer edge portion 50b1 on the right-hand side, and to be connected with the two first gasket portions G5w. The gasket G5 for the cooling medium has a feature in the structure of the first gasket portions G5w as described below.

Figure 3A:
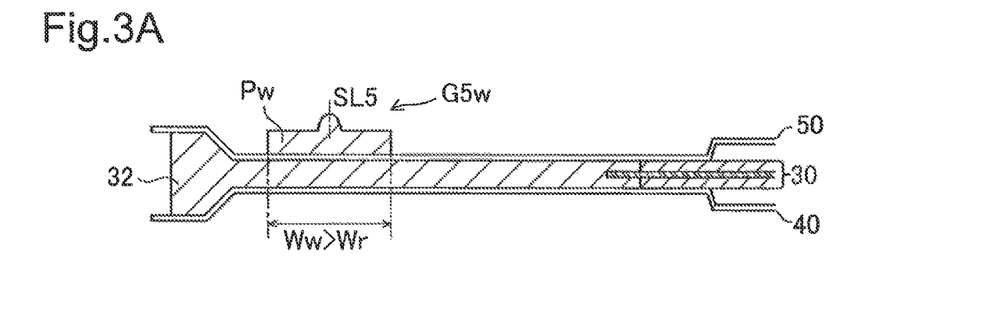
FIGS. 3A and 3B are enlarged sectional views schematically illustrating part of a gasket for cooling medium.
Figure 3B:
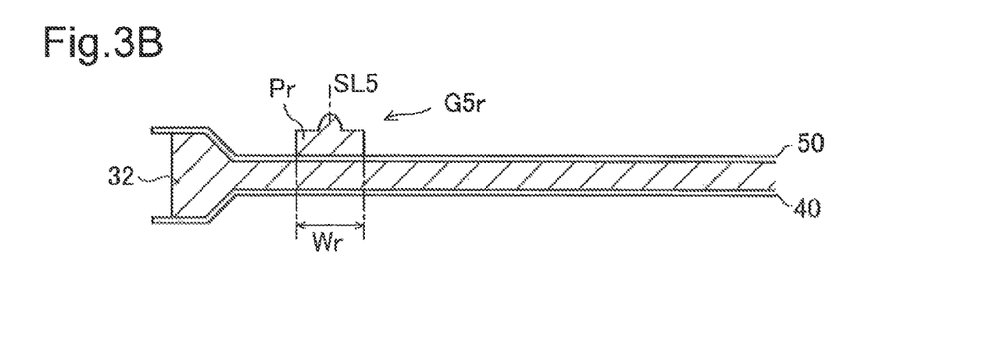

FIGS. 3A and 3B are enlarged sectional views schematically illustrating part of the gasket G5 for the cooling medium. FIG. 3A shows an A-A section of the first gasket portion G5w of FIG. 2, and FIG. 3B shows a B-B section of the second gasket portion G5r of FIG. 2. As can be understood from comparison between FIGS. 3A and 3B, the first gasket portion G5w of the gasket G5 for the cooling medium is configured by a first profile portion Pw having a protruded sectional shape, and a surface of the first profile portion Pw that is to be in contact with the plane of the anode-side separator 50 (cooling medium flow path surface) has a width Ww. The second gasket portion G5r is configured by a second profile portion Pr having a protruded sectional shape, and a surface of the second profile portion Pr that is to be in contact with the plane of the anode-side separator 50 (cooling medium flow path surface) has a width Wr. The width Ww of the first gasket portion G5w is larger than the width Wr of the second gasket portion G5r. The reason why the width Ww of the first gasket portion G5w is set larger than the width Wr of the second gasket portion G5r is as follows.

As described above, the area surrounded by the gasket G5 for the cooling medium (shown in FIG. 2) is the cooling medium flow path area in which the cooling medium (cooling water) supplied from the cooling medium supply manifold hole 82 flows through the cooling medium flow channels 54 in the separator center area 50a arranged to face the power generation area toward the cooling medium discharge manifold hole 84. The cooling medium flowing in this area absorbs heat generated in the power generation area, so as to cool the power generation area. Accordingly, the temperature of the cooling medium flowing in this area tends to be higher as the cooling medium goes downstream, or more specifically goes closer to the cooling medium discharge manifold hole 84 than the cooling medium supply manifold hole 82. With regard to the position in the vertical direction Y, the cooling medium discharge manifold hole 84 is located above the cooling medium supply manifold hole 82, so that the flow rate of the cooling medium tends to decrease in the upper cooling medium flow channel 54. Accordingly, the temperature of the cooling medium becomes higher in areas C1 and C2 on the downstream side shown in FIG. 2, compared with the other areas, and becomes highest especially in the area C2 near the upper end. Moreover the area C1 near the lower end has the higher pressure of the cooling medium (higher water pressure) than the area C2 near the upper end.

The gasket is bonded to the separator by the adhesive agent. In the gasket G5 provided to seal the circumference of the cooling medium flow path, exposure of the adhesive agent to the cooling medium is likely to reduce the adhesiveness in the exposed Part, thereby to cause partial peeling off of the gasket G5. The cooling medium penetrates into the peeled part and thereby gradually expands the part of the reduced adhesiveness. Eventually the peeled part may reach from inside to outside of the gasket in the width direction and is likely to cause leakage of the cooling medium. Further, oxidation of the surface of the separator 50 by the cooling medium (cooling water) is also likely to reduce the adhesiveness, thereby to cause peeling off of the gasket G5. Such reduction of the adhesiveness is attributed to the chemical reaction and thus becomes more significant at the higher temperature location. The reduction of the adhesiveness is accelerated by penetration of the cooling medium and accordingly becomes more significant at the location of the higher pressure of the cooling medium (higher water pressure).

Accordingly, the gasket G5 for the cooling medium is more likely to have the reduced adhesiveness and to be readily peeled off in the above described areas C1 and C2. These areas C1 and C2 are areas respectively adjacent to the upper and the lower ends of the separator center area 50a.

According to this embodiment, the width Ww of the first gasket portions G5w provided to be adjacent to the ends of the separator center area 50a is thus set to be larger than the width Wr of the second gasket portions G5r. This suppresses the first gasket portions G5w from being peeled off to cause leakage of the cooling medium. This results in improving the adhesive durability of the gasket G5 for the cooling medium. The width Ww of the first gasket portions G5w may be set arbitrarily based on, for example, the increased temperature of the cooling medium, the pressure of the cooling medium and the type of the adhesive agent, in order to make the adhesive durability of the first gasket portions G5w equivalent to the adhesive durability of the second gasket portions G5r. More specifically, the width Ww of the first gasket portions G5w is preferably set in a range as much as 1.5 to 5 times the width Wr of the second gasket portions G5w.

B. Second Embodiment

Figure 4A:
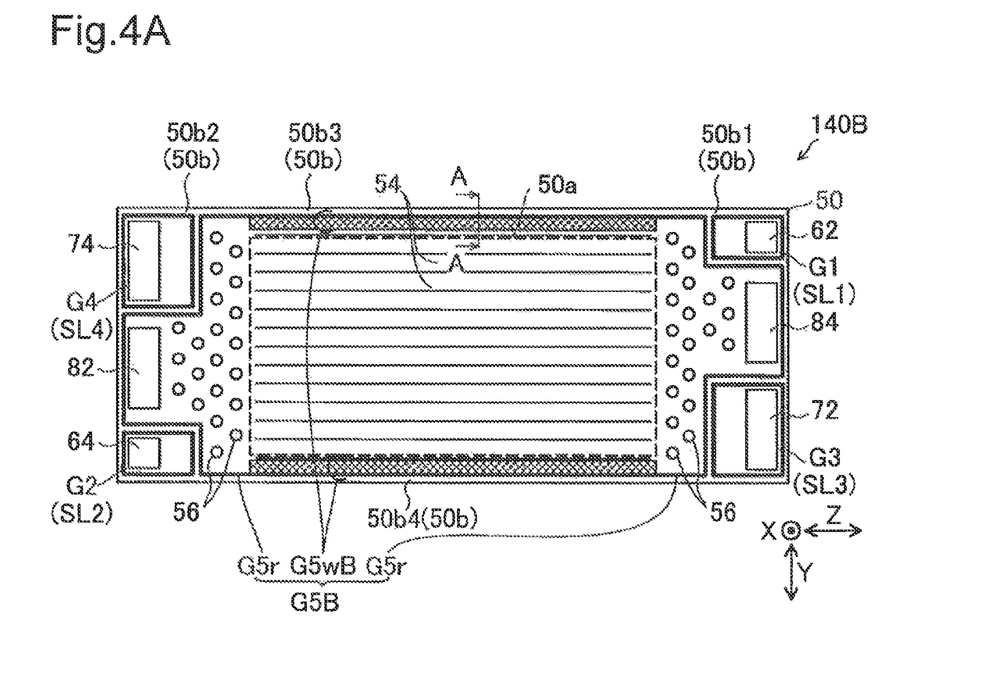
FIGS. 4A and 4B are diagrams illustrating a gasket for cooling medium provided in the anode-side separator according to a second embodiment.
Figure 4B:
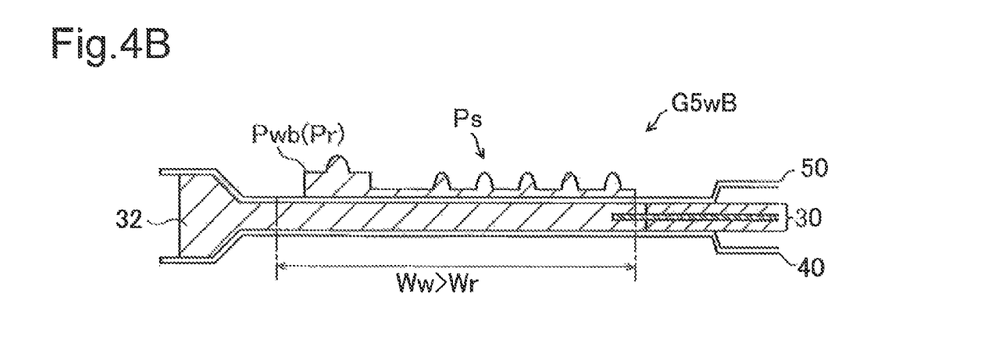

FIGS. 4A and 4B are diagrams illustrating a gasket G5B for the cooling medium provided in the anode-side separator 50 according to a second embodiment. FIG. 4A schematically illustrates a plane of the anode-side separator 50 of a unit cell 140B viewed from the cooling medium flow path surface side. FIG. 4B illustrates an A-A section of a first gasket portion G5wB of the gasket G5B for the cooling medium of FIG. 4A. The configuration of the unit cell 140B other than the gasket G5B for the cooling medium is similar to the configuration of the unit cell 140 of the first embodiment and is thus neither specifically illustrated nor described here.

As shown in FIG. 4B, the first gasket portion G5wB is configured by integrating a first profile portion Pwb with a side flow suppressing portion Ps. The first profile portion Pwb is a part extending along a side or side edge of the separator center area 50a at the end, and has the same sectional shape as that of the second profile portion Pr of the second gasket portion G5r (FIG. 3B). The side flow suppressing portion Ps is a part located in an area (also called "side flow area") between the first profile portion Pwb and the nearest fuel gas flow channel 52 nearest to this first profile portion Pwb. Since the side flow suppressing portion Ps is integrally molded with the first profile portion Pwb, the width Ww of the first gasket portion G5wB is set to be larger than the width Wr of the second gasket portion G5r. The side flow suppressing portion Ps serves to suppress the cooling medium from flowing (side flow) through the side flow areas, which are respectively present in the third outer edge portion 50b3 on the upper side and the fourth outer edge portion 50b4 and on the lower side of the separator center area 50a, within the entire cooling medium flow path area surrounded by the gasket G5B.

According to the second embodiment, the gasket G5B surrounding the outer circumference of the cooling medium flow path area is basically formed by the continuous body having the same sectional shape as that of the second gasket portion G5r, while the first gasket portion G5wB is configured by integrally molding this continuous body with the side flow suppressing portion Ps. This increases the width Ww of the first gasket portion G5wB and improves the adhesive durability of the gasket, while suppressing the side flow without providing a side flow suppressing member as a separate member. According to the second embodiment, the sectional shape of the first profile portion Pwb providing the sealing function of the first gasket portion G5wB is similar to the sectional shape of the second profile portion Pr of the second gasket portion G5r, and this configuration allows stress to be uniformly applied to a seal line SL5 formed by the gasket G5B in a state where it is in close contact with the adjacent unit cell 140B. This configuration accordingly suppresses stress concentration at any location (for example, boundary position between the first gasket portion G5wB and the second gasket portion G5r) and suppresses reduction of durability due to, for example, deterioration of the member at the location of stress concentration. The first profile portion Pwb may not necessarily have the same sectional shape as that of the second gasket portion G5r but may have a different sectional shape. It is, however, preferable that the first profile portion Pwb has the same width as that of the second gasket portion G5r.

C. Third Embodiment

Figure 5A:
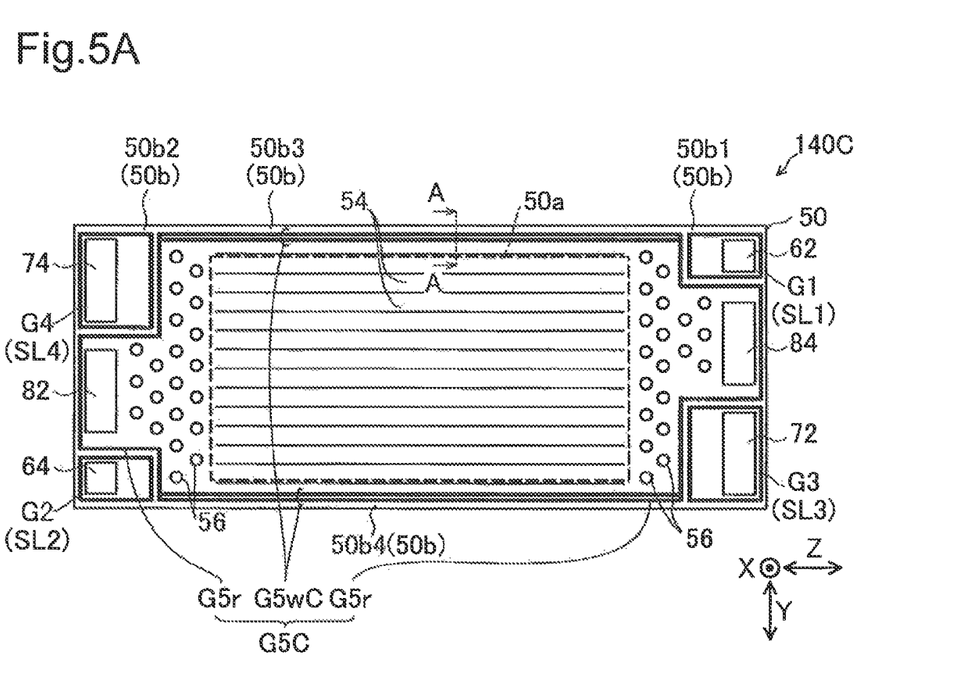
FIGS. 5A and 5B are diagrams illustrating a gasket for cooling medium provided in the anode-side separator according to a third embodiment.
Figure 5B:
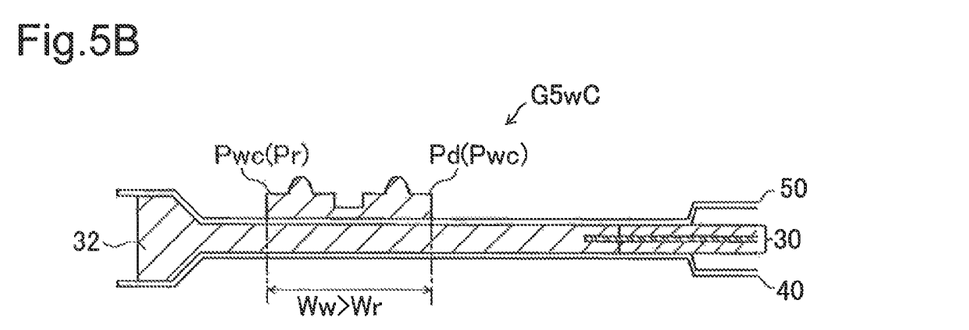

FIGS. 5A and 5B are diagrams illustrating a gasket G5C for the cooling medium provided in the anode-side separator 50 according to a third embodiment. FIG. 5A schematically illustrates a plane of the anode-side separator 50 of a unit cell 140C viewed from the cooling medium flow path surface side. FIG. 5B illustrates an A-A section of a first gasket portion G5wC of the gasket G5C for the cooling medium of FIG. 5A. The configuration of the unit cell 140C other than the gasket G5C for the cooling medium is similar to the configuration of the unit cell 140 of the first embodiment and is thus neither specifically illustrated nor described here.

As shown in FIG. 5B, the first gasket portion G5wC is configured by integrating a first profile portion Pwc with an additional portion Pd. Like the second embodiment, the first profile portion Pwc is a part extending along a side or side edge of the separator center area 50a at the end and has the same sectional shape as that of the second profile portion Pr of the second gasket Portion G5r (FIG. 3B). The additional portion Pd is a part configured to have the same sectional shape as that of the first profile portion Pwc and extending along the side or side edge of the separator center area 50a at the end. Since the additional portion Pd is integrally molded with the first profile portion Pwc, the width Ww of the first gasket portion G5wC is set to be larger than the width Wr of the second gasket portion G5r. In the illustrated example of FIG. 5B, a joint portion of a lower height is formed between the first profile portion Pwc and the additional portion Pd, but this joint portion may be omitted.

According to the third embodiment, the gasket G5C surrounding the outer circumference of the cooling medium flow path area is basically formed by the same sectional shape as that of the second gasket portion G5r, while the first gasket portion G5wC is configured by integrally molding the first profile portion Pwc extending along the side or side edge of the separator center area 50a at the end with the additional portion Pd parallel to the first profile portion Pwc. This increases the width Ww of the first gasket portion G5wC. This improves the adhesive durability of the gasket. According to the third embodiment, like the second embodiment, the sectional shape of the first profile portion Pwc providing the sealing function of the first gasket portion G5wC is similar to the sectional shape of the second profile portion Pr of the second gasket portion G5r continuous with the first gasket portion G5wC, and this configuration allows stress to be uniformly applied to a seal line SL5 formed by the gasket G5C in a state where it is in close contact with the adjacent unit cell 140C. This configuration accordingly suppresses stress concentration at any location (for example, boundary position between the first gasket portion G5wC and the second gasket portion G5r) and suppresses reduction of durability due to, for example, deterioration of the member at the location of stress concentration. The first profile portion Pwc may not necessarily have the same sectional shape as that of the second gasket portion G5r but may have a different sectional shape. It is, however, preferable that the first profile portion Pwc has the same width as that of the second gasket portion G5r.

D. Modifications (1) The above embodiments describe the configuration that all the manifold holes are arranged in the left and right outer edge portions of the separator center area 50a. This configuration is, however, not restrictive. For example, all manifold holes may be arranged in the upper and lower outer edge portions of the separator center area 50a. In this configuration, first gasket portions of the gasket for the cooling medium are to be located in left and right outer edge portions.

In another example, manifold holes of at least one reactive gas of the fuel gas and the oxidizing gas may be arranged in the upper and lower outer edge portions of the separator center area 50a. In this configuration, first gasket portions of the gasket provided to cover the entire cooling medium flow path area are to be located at positions that are on the inner side of gaskets surrounding the manifold holes of the reactive gas thus arranged, and are adjacent to the separator center area 50a.

(2) The above embodiments describe the configuration that the anode gas flow path and the cathode gas flow path are formed as channel-like flow paths in the separator. This configuration is, however, not restrictive. Either one or both of the anode gas flow path and the cathode gas flow path may be formed as a porous flow path located between the separator and the MEA.

(3) The above embodiments describe the gasket for the cooling medium. The invention is, however, similarly applicable to the gasket for the reactive gas (fuel gas, oxidizing gas) that extends adjacent to the end of the separator center area 50a in the outer edge portion of the separator center area 50a arranged to face the power generation area of the MEA. This is because the reactive gas flowing through the reactive gas flow path has high temperature and includes high-temperature water generated by power generation, and is thus likely to reduce the adhesiveness as is the case with the gasket for the cooling medium.

The invention is not limited to any of the embodiments, their examples and the modifications described above but may be implemented by a diversity of configurations without departing from the scope of the invention. For example, the technical features of any of the embodiments, their examples and the modifications corresponding to the technical features of the respective aspects described in Summary may be replaced or combined appropriately, in order to solve part or all of the problems described above or in order to achieve part or all of the advantageous effects described above. Components other than those described in independent claims among components of any of the embodiments, their examples and the modifications are additional components and may be omitted appropriately.

REFERENCE SIGNS LIST 10 fuel cell system
30 membrane electrode assembly (MEA)
32 sealing member
40 cathode-side separator 42 oxidizing gas flow channel
50 anode-side separator
50a separator center area
50b outer peripheral portion
50b1 first outer edge portion
50b2 second outer edge portion
50b3 third outer edge portion
50b4 fourth outer edge portion
52 fuel gas flow channel
54 cooling medium flow channel
56 dimple
62 fuel gas supply manifold hole
64 fuel gas discharge manifold hole
72 oxidizing gas supply manifold hole
74 oxidizing gas discharge manifold hole
82 cooling medium supply manifold hole
84 cooling medium discharge manifold hole
100 fuel cell stack
110 end plate
120 insulating plate
130 collector plate
140 unit cell
140B unit cell
140C unit cell
150 hydrogen tank
151 shutoff valve
152 regulator
153 supply pipe
154 discharge pipe
160 air pump
161 supply pipe
163 discharge pipe
170 radiator
171 water pump
172 pipe
173 pipe
Y vertical direction
X stacking direction
Z left-right direction
G1-G5 gaskets
G5B gasket
G5C gasket
SL1-SL5 seal lines
G5w first gasket portion
G5r second gasket portion
G5wB first gasket portion
G5wC first gasket portion
Pr second profile portion
Pw first profile portion
Ps side flow suppressing portion
Pd additional portion

The invention claimed is:
1. A separator that is used for a fuel cell and is to be located to face a membrane electrode assembly, the separator comprising:
   a separator center area that is arranged to face a power generation area of the membrane electrode assembly;
   an outer peripheral portion that is extended from the separator center area to outer periphery;
   a first manifold hole and a second manifold hole that are provided in the outer peripheral portion;
   a fluid flow path that is arranged to extend from the first manifold hole through the separator center area to the second manifold hole; and
   a gasket that is provided on the outer peripheral portion to surround an area of the fluid flow path and outer circumferences of the first and second manifold holes, wherein
   the gasket is divided into first gasket portions that are provided adjacent to ends of the separator center area and are extended along respective side edges at the ends, and second gasket portions that are provided to surround the outer circumferences of the first manifold hole and the second manifold hole, respectively, wherein
   the first gasket portions have a larger width than a width of the second gasket portions.
2. The separator according to claim 1, wherein
   the first gasket portions each includes a first profile portion that is extended to have a same width with the width of the second gasket portions, and a side flow suppressing portion that is provided to suppress part of a fluid flowing in the fluid flow path from flowing through a side flow area outside of the end of the separator center area, wherein the first profile portion and the side flow suppressing portion are integrally molded.
3. The separator according to claim 1, wherein
   the first gasket portions each includes a first profile portion that is extended to have a same width with the width of the second gasket portions, and an additional portion that is provided substantially parallel to the first profile portion, wherein the first profile portion and the additional portion are integrally molded.
4. The separator according to claim 1, wherein
   the fluid is a cooling medium,
   the fluid flow path is a cooling medium flow path for the cooling medium,
   the first manifold hole is a manifold hole for supplying the cooling medium, and
   the second manifold hole is a manifold hole for discharging the cooling medium.
5. A fuel cell configured such that a membrane electrode assembly and a separator are located to face each other, the separator comprising:
   a separator center area that is arranged to face a power generation area of the membrane electrode assembly;
   an outer peripheral portion that is extended from the separator center area to outer periphery;
   a first manifold hole and a second manifold hole that are provided in the outer peripheral portion;
   a fluid flow path that is arranged from the first manifold hole through the separator center area toward the second manifold hole; and
   a gasket that is provided in the outer peripheral portion to surround an area of the fluid flow path and outer circumferences of the first and the second manifold holes, wherein
   the gasket is divided into first gasket portions that are provided adjacent to ends of the separator center area and are extended along respective side edges at the ends, and second gasket portions that are provided to surround the outer circumferences of the first manifold hole and the second manifold hole, respectively, wherein
   the first gasket portions have a larger width than a width of the second gasket portions.
6. The fuel cell according to claim 5, wherein
   the first gasket portions each includes a first profile portion that is extended to have a same width with the width of the second gasket portions, and a side flow suppressing portion that is provided to suppress part of a fluid flowing in the fluid flow path from flowing through a side flow area outside of the end of the separator center area, wherein the first profile portion and the side flow suppressing portion are integrally molded.

7. The fuel cell according to claim 5, wherein
the first gasket portions each includes a first profile portion that is extended to have a same width with the width of the second gasket portions, and an additional portion that is provided substantially parallel to the first profile portion, wherein the first profile portion and the additional portion are integrally molded.

8. The fuel cell according to claim 1, wherein
the fluid is a cooling medium,
the fluid flow path is a cooling medium flow path for the cooling medium,
the first manifold hole is a manifold hole for supplying the cooling medium, and
the second manifold hole is a manifold hole for discharging the cooling medium.

\* \* \* \* \*